United States Patent
Reid

(10) Patent No.: US 6,825,292 B2
(45) Date of Patent: Nov. 30, 2004

(54) POLYMERIZATION PROCESS

(75) Inventor: John Norman Reid, Stirling (GB)

(73) Assignee: BP Chemicals Limited (GB)

( * ) Notice: Subject to any disclaimer, the term of this patent is extended or adjusted under 35 U.S.C. 154(b) by 26 days.

(21) Appl. No.: 10/257,161

(22) PCT Filed: Apr. 6, 2001

(86) PCT No.: PCT/GB01/01583

§ 371 (c)(1), (2), (4) Date: Oct. 9, 2002

(87) PCT Pub. No.: WO01/77190

PCT Pub. Date: Oct. 18, 2001

(65) Prior Publication Data

US 2003/0114609 A1 Jun. 19, 2003

(30) Foreign Application Priority Data

Apr. 10, 2000 (GB) .............................. 0008770

(51) Int. Cl.⁷ .................................................. C08F 4/44
(52) U.S. Cl. ........................ 526/89; 526/115; 526/117; 526/171; 526/172
(58) Field of Search .......................... 526/89, 115, 117, 526/171, 172

(56) References Cited

U.S. PATENT DOCUMENTS 6,180,735 B1 * 1/2001 Wenzel ...................... 526/142
6,284,849 B1 * 9/2001 Almquist et al. ............ 526/82

FOREIGN PATENT DOCUMENTS

| WO | WO 9526370 | * 10/1995 |
| WO | WO 9912981 | * 3/1999 |
| WO | WO 9946303 | * 9/1999 |
| WO | WO 9946308 | * 9/1999 |

* cited by examiner

Primary Examiner—Robert D. Harlan
(74) Attorney, Agent, or Firm—Finnegan, Henderson, Farabow, Garrett and Dunner, L.L.P.

(57) ABSTRACT

A process for transitioning between two catalysts is disclosed, comprising the steps of a) discontinuing the feed of the first catalyst into the polymerization reactor, and then b) introducing the second catalyst into the reactor, wherein one of the catalysts comprises a late transition metal catalyst and the other is a catalyst which is incompatible therewith. It is preferred that the late transition metal catalyst is a 2,6-diacetyl pyridine iron catalyst.

18 Claims, 1 Drawing Sheet

POLYMERIZATION PROCESS

The present invention relates to a process for the polymerisation and copolymerisation of 1-olefins, and particularly to a process for transitioning between different polymerization catalyst systems.

During the production of olefin polymers in a commercial reactor it is often necessary to transition from one type of catalyst system producing polymers having certain properties and characteristics to another catalyst system capable of producing polymers of different chemical and/or physical attributes. Transitioning between similar traditional Ziegler-Natta type catalysts for example, or compatible catalysts, generally takes place easily. However, where the catalysts are incompatible or of different types the process is typically complicated. For example, transitioning between a traditional Ziegler-Natta type catalyst and chromium based catalyst, two incompatible catalysts, it has been found that some of the components of the traditional Ziegler catalyst or the cocatalyst/activator act as poisons to the chromium based catalyst. Consequently, these poisons prevent the chromium catalyst from promoting polymerization. In another example, the extreme different responses to molecular weight regulators, such as hydrogen and comonomer, of traditional Ziegler-Natta catalysts and metallocene catalysts makes these catalysts incompatible. Any traces of active Ziegler-Natta catalyst will produce very high molecular weight product under metallocene catalyst reactor conditions. Furthermore, particularly in a continuous transitioning process, the interaction between the two incompatible catalysts may lead to production of high levels of small particles less than about 100 microns, termed fines. These fines can induce operability problems in the reactor such as fouling and sheeting.

In known transitioning techniques, to accomplish an effective transition between incompatible catalysts, the first catalyzed olefin polymerization process is stopped by various techniques known in the art. For example in reactions involving use of chromium based catalysts, oxygen, CO, water or polar hydrocarbons such as alcohols, ethers, ketones and aldehydes are known to be effective in reaction termination. The reactor is then emptied, recharged and a second catalyst is introduced into a reactor. Such catalyst conversions are time consuming and costly because of the need for a reactor shut-down for an extended period of time during transition.

WO 99/12981 discloses that ethylene and other 1-olefins may be polymerised by contacting it with certain late transition metal complexes of selected 2,6-pyridinecarboxaldehydebis (imines) and 2,6-diacylpyridinebis (imines).

EP-A-751965 discloses methods of transitioning between incompatible catalysts, involving the use of catalyst killers. It defines "incompatible" catalysts as those which satisfy one or more of the following criteria: 1) those catalysts that in each other's presence reduce the activity of at least one of the catalysts by greater than 50%; 2) those catalysts such that under the same reactive conditions one of the catalysts produces polymers having a molecular weight greater than two times higher than any other catalyst in the system; and 3) those catalysts that differ in comonomer incorporation or reactivity ratio under the same conditions by more than about 30%.

According to the above definition, late transition metal catalysts such as the above-mentioned 2,6-pyridinecarboxaldehydebis(imine) type catalysts are incompatible with most known types of catalysts. For example, 2,6-pyridinecarboxaldehydebis(imine) type catalysts typically exhibit a very low comonomer incorporation or reactivity ratio compared with other catalyst types. Accordingly it would be expected that transitioning from one to the other would require procedures such as those described above for incompatible catalysts, with all the attendant disadvantages.

We have surprisingly discovered however that it is possible to transition between late transition metal catalysts and catalysts which are incompatible according to the above definition without the need for such procedures.

Accordingly in a first aspect the present invention provides a process for the polymerisation and copolymerisation of 1-olefins in which a transition is made between two catalysts, comprising the steps of a) discontinuing the feed of the first catalyst into the polymerization reactor, and then b) introducing the second catalyst into the reactor, wherein one of the catalysts comprises a late transition metal catalyst and the other is a catalyst which is incompatible therewith.

Preferably the transition is effected by introducing the second catalyst without first eliminating all activity of the first catalyst and/or without first removing all traces of the first catalyst. More preferably, no deactivating agent (catalyst killer) is used.

In an alternative embodiment, subsequent to step a) a deactivating agent in a sufficient amount to deactivate the first catalyst is introduced into the reactor before the second catalyst is introduced into the reactor.

By "late transition metal catalyst" (hereinafter LTM catalyst) is meant a catalyst comprising a complex of a metal from Groups VIIIb or Ib of the Periodic Table.

By "incompatible" is meant the definition previously given: namely that the two catalysts satisfy at least one of the following conditions: 1) catalysts which in each other's presence reduce the activity of at least one of the catalysts by greater than 50%; 2) under the same reactive conditions one of the catalysts produces polymers having a molecular weight two times or more that of any other catalyst in the system; and 3) catalysts that differ in comonomer incorporation or reactivity ratio under the same conditions by more than 30%.

Catalysts which are incompatible with the LTM catalysts includes Phillips type (chromium) catalysts, metallocene catalysts and Ziegler-Natta catalysts. However this invention also includes within its scope the case where two LTM catalysts are incompatible with each other according to the above definition.

Preferably the LTM catalyst comprises a complex of the formula

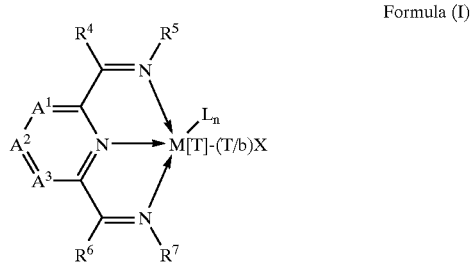

Formula (I)

wherein M is Fe[II], Fe[III], Co[II], Co[III], Ni[II], Rh[II], Rh[III], Ru[II], Ru[III], Ru[IV] or Pd[II]; X represents an atom or group covalently or ionically bonded to the transition metal M; T is the oxidation state of the transition metal M and b is the valency of the atom or group X; L is a group datively bound to M, and n is from 0 to 5; $A^1$ to $A^3$ are each independently N or P or CR, with the proviso that at least one is CR; and R and $R^4$ to $R^7$ are each independently selected from hydrogen, halogen, hydrocarbyl, substituted hydrocarbyl, heterohydrocarbyl, substituted heterohydrocarbyl or $SiR'_3$ where each R' is independently selected from hydrogen, halogen, hydrocarbyl, substituted hydrocarbyl, heterohydrocarbyl and substituted heterohydrocarbyl.

A typical Phillips type catalyst employs a combination of a support material to which has first been added a chromium-containing material wherein at least part of the chromium is in the hexavalent state by heating in the presence of molecular oxygen. The support is generally composed of about 80 to 100 wt. % silica, the remainder, if any, being selected from the group consisting of refractory metal oxides, such as aluminium, boria, magnesia, thoria, zirconia, titania and mixtures of two or more of these refractory metal oxides. Supports can also comprise alumina, aluminium phosphate, boron phosphate and mixtures thereof with each other or with silica.

The chromium compound is typically added to the support as a chromium (III) compound such as the acetate or acetylacetonate in order to avoid the toxicity of chromium (VI). The raw catalyst is then calcined in air at a temperature between 250 and 1000° C. for a period of from a few seconds to several hours. This converts at least part of the chromium to the hexavalent state. Reduction of the Cr VI to its active form normally occurs in the polymerisation reaction, but can be done at the end of the calcination cycle with CO at about 350° C.

Fluorine, aluminium and/or titanium may be added to the raw Phillips catalyst to modify it.

Metallocenes may typically be represented by the general formula:

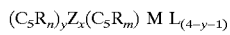

$(C_5R_n)_y Z_x (C_5R_m)$ M $L_{(4-y-1)}$ where $(C_5R_x)_n$ and $(C_5R_m)$ are cyclopentadienyl ligands, R is hydrogen, alkyl, aryl, alkenyl, etc.

M is a Group IVA metal

Z is a bridging group,

L is an anionic ligand, and y is 0,1 or 2, n and m are from 1 to 5, x is 0 or 1.

The most preferred complexes are those wherein y is 1 and L is halide or alkyl. Typical examples of such complexes are bis(cyclopentadienyl)zirconium dichloride and bis(cyclopentadienyl zirconium dimethyl. In such metallocene complexes the cyclopentadienyl ligands may suitably be substituted by alkyl groups such as methyl, n-butyl or vinyl. Alternatively the R groups may be joined together to form a ring substituent, for example indenyl or fluorenyl. The cyclopentadienyl ligands may be the same or different. Typical examples of such complexes are bis(n-butylcyclopentadienyl)zirconium dichloride or bis(methylcyclopentadienyl)zirconium dichloride.

Further examples of metallocene complexes are those wherein the anionic ligand represented in the above formula is replaced with a diene moiety. In such complexes the transition metal may be in the +2 or +4 oxidation state and a typical example of this type of complex is ethylene bis indenyl zirconium (II) 1,4-diphenyl butadiene. Examples of such complexes may be found in EP 775148A the disclosure of which is incorporated herein by reference.

Ziegler-Natta catalysts, in general, consist of two main components. One component is an alky or hydride of a Group I to III metal, most commonly $Al(Et)_3$ or $Al(iBu)_3$ or $Al(Et)_2Cl$ but also encompassing Grignard reagents, n-butyllithium, or dialkylzinc compounds. The second component is a salt of a Group IV to VIII transition metal, most commonly halides of titanium or vanadium such as $TiCl_4$, $TiCl_3$, $VCl_4$, or $VOCl_3$. The catalyst components when mixed, usually in a hydrocarbon solvent, may form a homogeneous or heterogeneous product. Such catalysts may be impregnated on a support, if desired, by means known to those skilled in the art and so used in any of the major processes known for co-ordination catalysis of polyolefins such as solution, slurry, and gas-phase. In addition to the two major components described above, minor amounts of other compounds (typically electron donors) may be added to further modify the polymerisation behaviour or activity of the catalyst. A wide variety of monomers may thus be polymerised by Ziegler-Natta catalysts. Depending on the particular components used, and the specific method of combination, it is possible to produce catalysts which are very effective for the polymerisation and copolymerisation of ethylene, dienes, and higher alpha-olefins. Particularly important applications for Ziegler-Natta catalysts are for the manufacture of high molecular weight ethylene copolymers and isotactic polypropylene.

It will be understood that the transitioning process of the invention can be performed in either direction—i.e. from the LTM catalyst to the other catalyst or vice versa. Furthermore, it will be understood that whilst it is not in fact necessary to take any action to address the activity/presence of the first catalyst before adding the second, it is within the scope of the invention to reduce or eliminate the activity of the first catalyst and/or to remove at least part of the catalyst. For example, the activity of the first catalyst may be reduced by up to 30% from its maximum prior to addition of the second catalyst, or alternatively by up to 50, 70 or by at least 95%, or it may be killed completely. For reducing activity, known catalyst inhibitors or poisons such as oxygen, water, ammonia, carbon monoxide, carbon dioxide, alcohols and ketones may be used. Partial reduction in activity of the first catalyst may also for example be achieved by continuing polymerisation for a certain period of time (for example between 5 minutes and 12 hours) after having discontinued introduction of the first catalyst and/or any associated co-catalyst, before commencing introduction of the second catalyst and/or its associated co-catalyst.

After introduction of the first catalyst has been discontinued, the polymerisation reactor may be partially or completely emptied. Completely emptying the reactor ensures that when the second catalyst is introduced, all the polymer subsequently produced is purely that derived from the second catalyst. However it is preferred at most only to partially empty the reactor, e.g. by reducing the bed height in the case of a gas phase fluidised bed reactor, as this is less disruptive of the polymerisation process. Although this results in the polymerisation with the second catalyst initially producing polymer which is mixed with polymer derived from the first catalyst, this is a relatively minor problem in the case of the present invention, because one of the catalysts is a late transition metal catalyst. Typically, between zero and half of the contents of the reactor by volume may be removed, though preferably only one third or less are removed. In the most preferred case, none of the contents of the reactor are removed prior to commencing the polymerisation with the second catalyst.

When transitioning from a first to a second catalyst the usual initial step is to discontinue the catalyst feed. If desired, the polymerisation reactor may then be partially or completely emptied, as discussed above. The new catalyst is then introduced and, if necessary, the reactor conditions are adapted to the conditions required by the new catalyst. For example, in the case of transition from a chromium catalyst when the reactor is not completely emptied, the transition is followed by IR measurements on the produced polymer to determine when the system is free from any chromium-based polymer, i.e. to determine when the produced polymer is within the LTM polymer specifications. The transition can also be followed by melt index measurements of the produced polymer.

The specific reactor conditions during transition depend inter alia on catalyst activity, type and amount of comonomer, type of polymer to be produced, and the production equipment. Consequently, they have to be determined for each specific product in a particular plant. For example, in general the reactor conditions when using metallocene catalysts include a reduced feed of comonomer because the comonomers are much more readily incorporated in metallocene catalyzed polymers than in LTM catalysed polymers of equal polymer density. The melt flow index is corrected by introducing hydrogen, and also, to a certain degree, ethylene.

A particularly favoured transition is that between 2,6-pyridinecarboxaldehydebis(imine) type catalysts comprising complexes of the formula (I) as defined above, and chromium catalysts.

It is preferred that the process of the invention is carried out in slurry or gas phase.

In the complexes of Formula (I) it is preferred that $A^1$ to $A^3$ are each independently CR where each R is as defined above. In alternative preferred embodiments, $A^1$ and $A^3$ are both N and $A^2$ is CR, or one of $A^1$ to $A^3$ is N and the others are independently CR.

The group L may be an ether such as tetrahydrofuran or diethylether, and alcohol such as ethanol or butanol, a primary, secondary or tertiary amine, or a phosphine.

Preferred catalysts based on complexes of the Formula (I) comprise a complex having the formula

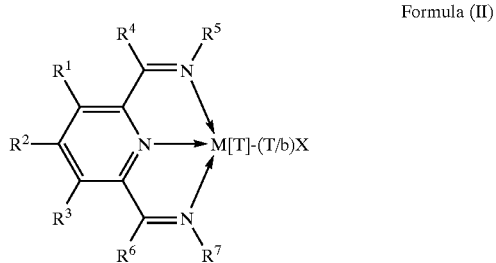

Formula (II)

wherein $R^1$ to $R^7$ are each independently selected from hydrogen, halogen, hydrocarbyl, substituted hydrocarbyl, heterohydrocarbyl, substituted heterohydrocarbyl or $SiR'_3$ where each R' is independently selected from hydrogen, halogen, hydrocarbyl, substituted hydrocarbyl, heterohydrocarbyl, substituted heterohydrocarbyl.

$R^5$ and $R^7$ are preferably independently selected from substituted or unsubstituted alicyclic, heterocyclic or aromatic groups, for example, phenyl, 1-naphthyl, 2-naphthyl, 2-methylphenyl, 2-ethylphenyl, 2,6-diisopropylphenyl, 2,3-diisopropylphenyl, 2,4-diisopropylphenyl, 2,6-di-n-butylphenyl, 2,6-dimethylphenyl, 2,3-dimethylphenyl, 2,4-dimethylphenyl, 2-t-butylphenyl, 2,6-diphenylphenyl, 2,4,6-trimethylphenyl, 2,6-trifluoromethylphenyl, 4-bromo-2,6-dimethylphenyl, 3,5 dichloro2,6-diethylphenyl, and 2,6,bis (2,6-dimethylphenyl)phenyl, cyclohexyl and pyridinyl.

In a preferred embodiment $R^5$ is represented by the group "P" and $R^7$ is represented by the group "Q" as follows:

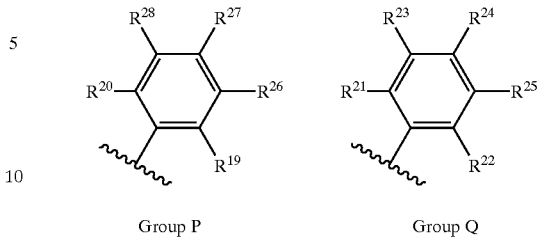

Group P            Group Q wherein $R^{19}$ to $R^{28}$ are independently selected from hydrogen, halogen, hydrocarbyl, substituted hydrocarbyl, heterohydrocarbyl or substituted heterohydrocarbyl; when any two or more of $R^1$ to $R^4$, $R^6$ and $R^{19}$ to $R^{28}$ are hydrocarbyl, substituted hydrocarbyl, heterohydrocarbyl or substituted heterohydrocarbyl, said two or more can be linked to form one or more cyclic substituents.

The ring systems P and Q are preferably independently 2,6-hydrocarbylphenyl or fused-ring polyaromatic, for example, 1-naphthyl, 2-naphthyl, 1-phenanthrenyl and 8-quinolinyl.

Preferably at least one of $R^{19}$, $R^{20}$, $R^{21}$ and $R^{22}$ is hydrocarbyl, substituted hydrocarbyl, heterohydrocarbyl or substituted heterohydrocarbyl. More preferably at least one of $R^{19}$ and $R^{20}$, and at least one of $R^{21}$ and $R^{22}$, is hydrocarbyl, substituted hydrocarbyl, heterohydrocarbyl or substituted heterohydrocarbyl. Most preferably $R^{19}$, $R^{20}$, $R^{21}$ and $R^{22}$ are all independently selected from hydrocarbyl, substituted hydrocarbyl, heterohydrocarbyl or substituted heterohydrocarbyl. $R^{19}$, $R^{20}$, $R^{21}$ and $R^{22}$ are preferably independently selected from methyl, ethyl, n-propyl, iso-propyl, n-butyl, sec-butyl, tert.-butyl, n-pentyl, neopentyl, n-hexyl, 4-methylpentyl, n-octyl, phenyl and benzyl.

$R^1$, $R^2$, $R^3$, $R^4$, $R^6$, $R^{19}$, $R^{20}$, $R^{21}$, $R^{22}$, $R^{23}$, $R^{25}$, $R^{26}$ and $R^{28}$ are preferably independently selected from hydrogen and $C_1$ to $C_8$ hydrocarbyl, for example, methyl, ethyl, n-propyl, n-butyl, t-butyl, n-hexyl, n-octyl, phenyl and benzyl.

In an alternative embodiment $R^5$ is a group having the formula $-NR^{29}R^{30}$ and $R^7$ is a group having the formula $-NR^{31}R^{32}$, wherein $R^{29}$ to $R^{32}$ are independently selected from hydrogen, halogen, hydrocarbyl, substituted hydrocarbyl, heterohydrocarbyl or substituted heterohydrocarbyl; when any two or more of $R^1$ to $R^4$, $R^6$ and $R^{29}$ to $R^{32}$ are hydrocarbyl, substituted hydrocarbyl, heterohydrocarbyl or substituted heterohydrocarbyl, said two or more can be linked to form one or more cyclic substituents.

Each of the atoms nitrogen atoms is coordinated to the metal by a "dative" bond, ie a bond formed by donation of a lone pair of electrons from the nitrogen atom. The remaining bonds on each of these atoms are covalent bonds formed by electron sharing between the atoms and the organic ligand as shown in the defined formula for the metal complex illustrated above.

The atom or group represented by X in the compounds of Formula (I) and (II) can be, for example, selected from halide, sulphate, nitrate, thiolate, thiocarboxylate, $BF_4^-$, $PF_6^-$, hydride, hydrocarbyloxide, carboxylate, hydrocarbyl, substituted hydrocarbyl and heterohydrocarbyl, or β-diketonates. Examples of such atoms or groups are chloride, bromide, methyl, ethyl, propyl, butyl, octyl, decyl, phenyl, benzyl, methoxide, ethoxide, isopropoxide, tosylate, triflate, formate, acetate, phenoxide and benzoate. Preferred examples of the atom or group X in the compounds of Formula (I) are halide, for example, chloride, bromide; hydride; hydrocarbyloxide, for example, methoxide, ethoxide, isopropoxide, phenoxide; carboxylate, for example, formate, acetate, benzoate; hydrocarbyl, for example, methyl ethyl, propyl, butyl, octyl, decyl, phenyl, benzyl; substituted hydrocarbyl; heterohydrocarbyl; tosylate; and triflate. Preferably X is selected from halide, hydride and hydrocarbyl. Chloride is particularly preferred.

Preferred metals M in the complexes of Formula (I) are Fe and Co.

Preferred compounds of the Formula (I) include the following:

2,6-diacetylpyridinebis(2,6-diisopropylanil)$FeCl_2$
2,6-diacetylpyridine(2,6-diisopropylanil)$CoCl_2$
2,6-diacetylpyridinebis(2-tert.-butylanil)$FeCl_2$
2,6-diacetylpyridinebis(2,3-dimethylanil)$FeCl_2$
2,6-diacetylpyridinebis(2-methylanil)$FeCl_2$
2,6-diacetylpyridinebis(2,4-dimethylanil)$FeCl_2$
2,6-diacetylpyridinebis(2,6-dimethylanil)$FeCl_2$
2,6-diacetylpyridinebis(2,4,6 trimethyl anil)$FeCl_2$
2,6-dialdiminepyridinebis(2,6-dimethylanil)$FeCl_2$
2,6-dialdiminepytidinebis(2,6-diethylanil)$FeCl_2$
2,6-dialdiminepyridinebis(2,6-diisopropylanil)$FeCl_2$
2,6-dialdiminepyridinebis(1-naphthil)$FeCl_2$ or
2,6-bis(1,1-diphenylhydrazone)pyridine $FeCl_2$.

Each of the catalysts utilised in the present invention can if desired comprise more than one compound of that type. For example, the catalysts of Formula (I) can also include one or more other types of transition metal compounds or catalysts, for example, nitrogen containing catalysts such as those described in our copending applications WO 99/12981 or GB 9903402.7.

The complexes of formula (I) are generally used as catalysts in conjunction with activator compounds. Examples of such activator compounds include organoaluminium compounds and hydrocarbylboron compounds. Suitable organoaluminium compounds include compounds of the formula $AlR_3$, where each R is independently $C_1$-$C_{12}$ alkyl or halo. Examples include trimethylaluminium (TMA), triethylaluminium (TEA), tri-isobutylaluminium (TIBA), tri-n-octylaluminium, methylaluminium dichloride, ethylaluminium dichloride, dimethylaluminium chloride, diethylaluminium chloride, ethylaluminiumsesquichloride, methylaluminiumsesquichloride, and alumoxanes. Alumoxanes are well known in the art as typically the oligomeric compounds which can be prepared by the controlled addition of water to an alkylaluminium compound, for example trimethylaluminium. Such compounds can be linear, cyclic or mixtures thereof. Commercially available alumoxanes are generally believed to be mixtures of linear and cyclic compounds. The cyclic alumoxanes can be represented by the formula $[R^{16}AlO]_s$ and the linear alumoxanes by the formula $R^{17}(R^{18}AlO)_s$ wherein s is a number from about 2 to 50, and wherein $R^{16}$, $R^{17}$, and $R^{18}$ represent hydrocarbyl groups, preferably $C_1$ to $C_6$ alkyl groups, for example methyl, ethyl or butyl groups. Alkylalumoxanes such as methylalumoxane (MAO) are preferred.

Mixtures of alkylalumoxanes and trialkylaluminium compounds are particularly preferred, such as MAO with TMA or TIBA. In this context it should be noted that the term "alkylalumoxane" as used in this specification includes alkylalumoxanes available commercially which may contain a proportion, typically about 10 wt %, but optionally up to 50 wt %, of the corresponding trialkylaluminium; for instance, commercial MAO usually contains approximately 10 wt % trimethylaluminium (TMA), whilst commercial MMAO contains both TMA and TIBA. Quantities of alkylalumoxane quoted herein include such trialkylaluminium impurities, and accordingly quantities of trialkylaluminium compounds quoted herein are considered to comprise compounds of the formula $AlR_3$ additional to any $AlR_3$ compound incorporated within the alkylalumoxane when present.

Examples of suitable hydrocarbylboron compounds are boroxines, trimethylboron, triethylboron, dimethylphenylammoniumtetra(phenyl)borate, trityltetra(phenyl)borate, triphenylboron, dimethylphenylammonium tetra(pentafluorophenyl)borate, sodium tetrakis[(bis-3,5-trifluoromethyl)phenyl]borate, $H^+(OEt_2)[(bis-3,5-trifluoromethyl)phenyl]borate$, trityltetra(pentafluorophenyl)borate and tris(pentafluorophenyl) boron.

An alternative class of activators comprise salts of a cationic oxidising agent and a non-coordinating compatible anion. Examples of cationic oxidising agents include: ferrocenium, hydrocarbyl-substituted ferrocenium, $Ag^+$, or $Pb^{2+}$. Examples of non-coordinating compatible anions are $BF_4^-$, $SbF_6^-$, $PF_6^-$, tetrakis(phenyl)borate and tetrakis(pentafluorophenyl)borate.

The catalysts utilised in the present invention can be unsupported or supported on a support material, for example, silica, alumina, $MgCl_2$ or zirconia, or on a polymer or prepolymer, for example polyethylene, polypropylene, polystyrene, or poly(aminostyrene).

The polymerisation conditions can be, for example, solution phase, slurry phase, gas phase or bulk phase, with polymerisation temperatures ranging from −100° C. to +300° C., and at pressures of atmospheric and above, particularly from 140 to 4100 kPa. If desired, the catalyst can be used to polymerise ethylene under high pressure/high temperature process conditions wherein the polymeric material forms as a melt in supercritical ethylene. Preferably the polymerisation is conducted under gas phase fluidised bed or stirred bed conditions.

Suitable monomers for use in the polymerisation process of the present invention are, for example, ethylene and $C_{2-20}$ α-olefins, specifically propylene, 1-butene, 1-pentene, 1-hexene, 4-methylpentene-1,1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, and 1-eicosene. Other monomers include methyl methacrylate, methyl acrylate, butyl acrylate, acrylonitrile, vinyl acetate, and styrene. Preferred monomers for homopolymerisation processes are ethylene and propylene.

The process of the invention can also be used for copolymerising ethylene or propylene with each other or with other 1-olefins such as 1-butene, 1-hexene, 4-methylpentene-1, and octene, or with other monomeric materials, for example, methyl methacrylate, methyl acrylate, butyl acrylate, acrylonitrile, vinyl acetate, and styrene.

Irrespective of the polymerisation or copolymerisation technique employed, polymerisation or copolymerisation is typically carried out under conditions that substantially exclude oxygen, water, and other materials that act as catalyst poisons. Also, polymerisation or copolymerisation can be carried out in the presence of additives to control polymer or copolymer molecular weights.

Slurry phase polymerisation conditions or gas phase polymerisation conditions are particularly useful for the production of high or low density grades of polyethylene, and polypropylene. In these processes the polymerisation conditions can be batch, continuous or semi-continuous. Furthermore, one or more reactors may be used, e.g. from two to five reactors in series. Different reaction conditions, such as different temperatures or hydrogen or comonomer concentrations may be employed in the different reactors. In the slurry phase process and the gas phase process, the catalyst is generally metered and transferred into the polymerisation zone in the form of a particulate solid either as a dry powder (e.g. with an inert gas) or as a slurry. This solid can be, for example, a solid catalyst system formed from the one or more of complexes of the invention and an activator with or without other types of catalysts, or can be the solid catalyst alone with or without other types of catalysts. In the latter situation, the activator can be fed to the polymerisation zone, for example as a solution, separately from or together with the solid catalyst. Preferably the catalyst system or the transition metal complex component of the catalyst system employed in the slurry polymerisation and gas phase polymerisation is supported on one or more support materials. Most preferably the catalyst system is supported on the support material prior to its introduction into the polymerisation zone. Suitable support materials are, for example, silica, alumina, zirconia, talc, kieselguhr, or magnesia. Impregnation of the support material can be carried out by conventional techniques, for example, by forming a solution or suspension of the catalyst components in a suitable diluent or solvent, and slurrying the support material therewith. The support material thus impregnated with catalyst can then be separated from the diluent for example, by filtration or evaporation techniques. Once the polymer product is discharged from the reactor, any associated and absorbed hydrocarbons are substantially removed, or degassed, from the polymer by, for example, pressure letdown or gas purging using fresh or recycled steam, nitrogen or light hydrocarbons (such as ethylene). Recovered gaseous or liquid hydrocarbons may be recycled to the polymerisation zone.

In the slurry phase polymerisation process the solid particles of catalyst, or supported catalyst, are fed to a polymerisation zone either as dry powder or as a slurry in the polymerisation diluent. The polymerisation diluent is compatible with the polymer(s) and catalyst(s), and may be an alkane such as hexane, heptane, isobutane, or a mixture of hydrocarbons or paraffins. Preferably the particles are fed to a polymerisation zone as a suspension in the polymerisation diluent. The polymerisation zone can be, for example, an autoclave or similar reaction vessel, or a continuous loop reactor, e.g. of the type well-know in the manufacture of polyethylene by the Phillips Process. When the polymerisation process of the present invention is carried out under slurry conditions the polymerisation is preferably carried out at a temperature above 0° C., most preferably above 15° C. The polymerisation temperature is preferably maintained below the temperature at which the polymer commences to soften or sinter in the presence of the polymerisation diluent. If the temperature is allowed to go above the latter temperature, fouling of the reactor can occur. Adjustment of the polymerisation within these defined temperature ranges can provide a useful means of controlling the average molecular weight of the produced polymer. A further useful means of controlling the molecular weight is to conduct the polymerisation in the presence of hydrogen gas which acts as chain transfer agent. Generally, the higher the concentration of hydrogen employed, the lower the average molecular weight of the produced polymer.

In bulk polymerisation processes, liquid monomer such as propylene is used as the polymerisation medium.

Methods for operating gas phase polymerisation processes are well known in the art. Such methods generally involve agitating (e.g. by stirring, vibrating or fluidising) a bed of catalyst, or a bed of the target polymer (i.e. polymer having the same or similar physical properties to that which it is desired to make in the polymerisation process) containing a catalyst, and feeding thereto a stream of monomer at least partially in the gaseous phase, under conditions such that at least part of the monomer polymerises in contact with the catalyst in the bed. The bed is generally cooled by the addition of cool gas (e.g. recycled gaseous monomer) and/or volatile liquid (e.g. a volatile inert hydrocarbon, or gaseous monomer which has been condensed to form a liquid). The polymer produced in, and isolated from, gas phase processes forms directly a solid in the polymerisation zone and is free from, or substantially free from liquid. As is well known to those skilled in the art, if any liquid is allowed to enter the polymerisation zone of a gas phase polymerisation process the quantity of liquid in the polymerisation zone is small in relation to the quantity of polymer present. This is in contrast to "solution phase" processes wherein the polymer is formed dissolved in a solvent, and "slurry phase" processes wherein the polymer forms as a suspension in a liquid diluent.

The gas phase process can be operated under batch, semi-batch, or so-called "continuous" conditions. It is preferred to operate under conditions such that monomer is continuously recycled to an agitated polymerisation zone containing polymerisation catalyst, make-up monomer being provided to replace polymerised monomer, and continuously or intermittently withdrawing produced polymer from the polymerisation zone at a rate comparable to the rate of formation of the polymer, fresh catalyst being added to the polymerisation zone to replace the catalyst withdrawn form the polymerisation zone with the produced polymer.

Methods for operating gas phase fluidised bed processes for making polyethylene, ethylene copolymers and polypropylene are well known in the art. The process can be operated, for example, in a vertical cylindrical reactor equipped with a perforated distribution plate to support the bed and to distribute the incoming fluidising gas stream through the bed. The fluidising gas circulating through the bed serves to remove the heat of polymerisation from the bed and to supply monomer for polymerisation in the bed. Thus the fluidising gas generally comprises the monomer(s) normally together with some inert gas (e.g. nitrogen or inert hydrocarbons such as methane, ethane, propane, butane, pentane or hexane) and optionally with hydrogen as molecular weight modifier. The hot fluidising gas emerging from the top of the bed is led optionally through a velocity reduction zone (this can be a cylindrical portion of the reactor having a wider diameter) and, if desired, a cyclone and or filters to disentrain fine solid particles from the gas stream. The hot gas is then led to a heat exchanger to remove at least part of the heat of polymerisation. Catalyst is preferably fed continuously or at regular intervals to the bed. At start up of the process, the bed comprises fluidisable polymer which is preferably similar to the target polymer. Polymer is produced continuously within the bed by the polymerisation of the monomer(s). Preferably means are provided to discharge polymer from the bed continuously or at regular intervals to maintain the fluidised bed at the desired height. The process is generally operated at relatively low pressure, for example, at 10 to 50 bars, and at temperatures for example, between 50 and 120° C. The temperature of the bed is maintained below the sintering temperature of the fluidised polymer to avoid problems of agglomeration.

When using the catalysts of the present invention under gas phase polymerisation conditions, the catalyst, or one or more of the components employed to form the catalyst can, for example, be introduced into the polymerisation reaction zone in liquid form, for example, as a solution in an inert liquid diluent. Thus, for example, the transition metal component, or the activator component, or both of these components can be dissolved or slurried in a liquid diluent and fed to the polymerisation zone. Under these circumstances it is preferred the liquid containing the component(s) is sprayed as fine droplets into the polymerisation zone. The droplet diameter is preferably within the range 1 to 1000 microns. EP-A-0593083, the teaching of which is hereby incorporated into this specification, discloses a process for introducing a polymerisation catalyst into a gas phase polymerisation. The methods disclosed in EP-A-0593083 can be suitably employed in the polymerisation process of the present invention if desired.

The present invention is illustrated in the following Examples. The two catalysts used are incompatible according to category 2) of the previously mentioned definition, in that they have substantially differing HLMI.

EXAMPLES

Example 1a

Preparation of 2,6-diacetylpyridinebis(2,4,6 trimethyl anil) FeCl$_2$ Supported on Silica (Catalyst 1)

Catalyst 1 was made as described in detail in WO 99/46304, incorporated herein by reference. The silica support was preimpregnated with MAO (methylaluminoxane).

Example 1b

Preparation of Chromium Catalyst (Catalyst 2)

A silica supported chromium catalyst, Grace Sylopol HA30W, typical surface area 500 m$^2$/g and 1.5 ml/g pore volume, containing 1% chromium, was activated by heating in dry air within a fluidised bed. 700 g of catalyst was fluidised at 30 mm/sec air velocity. Activation temperature was ramped at 100° C./hour to a hold temperature of 650° C., which was then maintained for 5 hours. The catalyst was then cooled under air fluidisation to 325° C., then fluidised in dry nitrogen during cooling to ambient temperature. The activated catalyst was stored under a dry nitrogen atmosphere prior to use.

Example 1c

Pilot Scale Process Operation

Transitioning Between Pyridinecarboxaldehydebis (imine) Type Catalyst and Phillips Catalyst A 93 liter Phillips continuous polymerisation loop reactor was used for the polymerisations. Ethylene, isobutane diluent, hydrogen and catalyst were metered into the reactor to maintain the reaction conditions as detailed in Table 1 below. The reactor incorporated two separate catalyst feeder systems, which enabled storage of the individual catalysts as isobutane slurries. A pressurised metering system was employed to control addition of either to the reactor. Catalysts 1 and 2 were charged separately to each feeder system. The reactor was operated at 600 psig and 90° C. with a polyethylene throughput of 6.8–7.6 kg/hour.

Reaction conditions were established to demonstrate the catalyst productivity and basic polymer properties obtained in use of the Phillips catalyst (Catalyst 2, Condition 1). Subsequently, from a clean reactor startup, process conditions and polymer properties were established from use of Catalyst 1 (Condition 2). A transition from Catalyst 1 to Catalyst 2 was then made by simply switching between catalyst supply feeders, without alteration of reaction conditions nor any addition of reaction kill agents, nor flushing of reactor contents (Condition 3). Reaction conditions were maintained to demonstrate the attainment of the predetermined process conditions and polymer properties established under Condition 1.

DESCRIPTION OF DRAWING

A similar transition was then made to return to Catalyst 1, again without deliberate poison addition or flushing of reactor contents (Condition 4). The results summarised in the attached table and in FIG. 1.

TABLE 1

Figure 1:
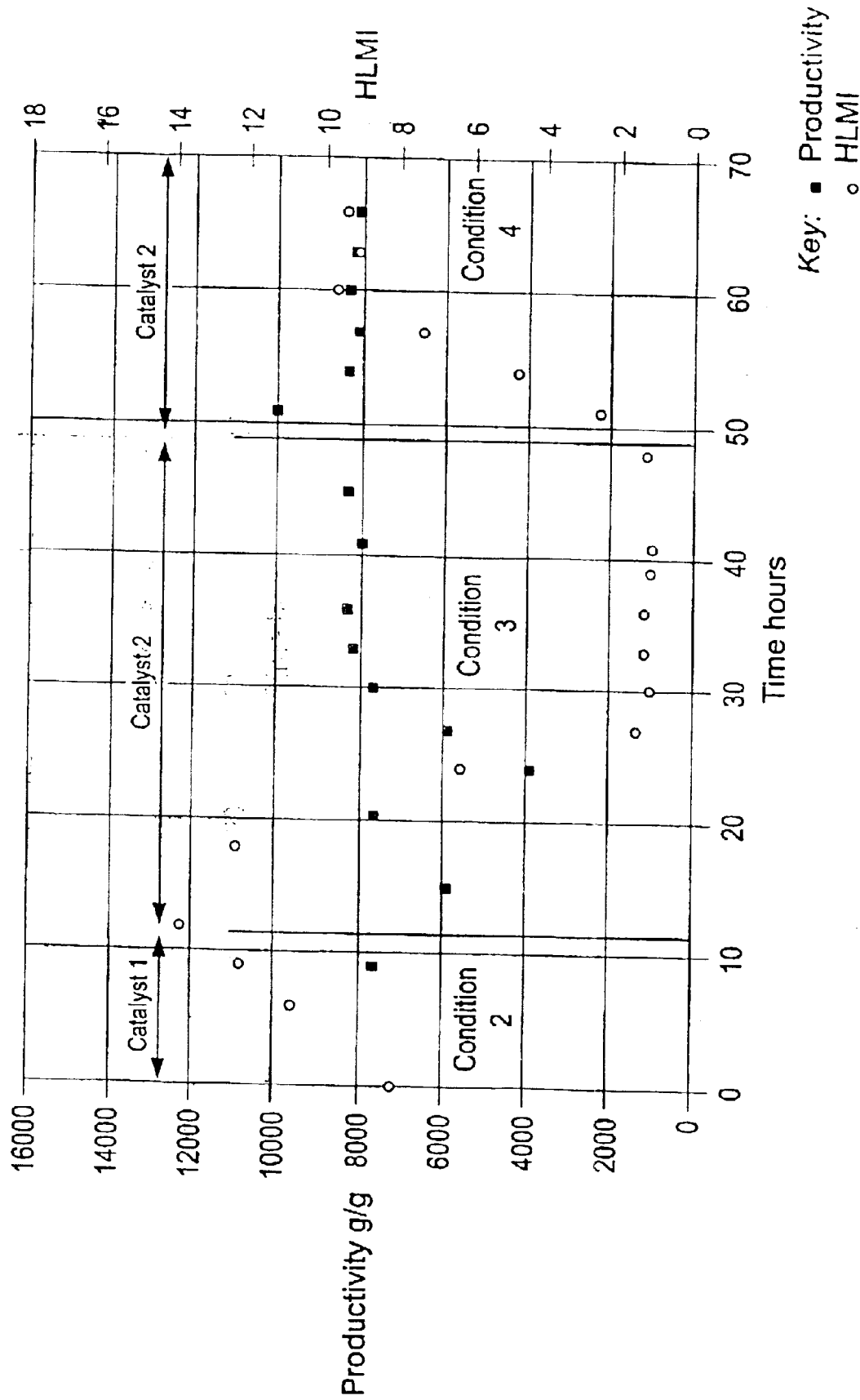

| Condition | 1 | 2 | 3 | 4 |
| --- | --- | --- | --- | --- |
| Catalyst | 2 Reference | 1 Startup | 2 Transition 1 | 1 Transition 2 |
| Temperature (° C.) | 90 | 90 | 90 | 90 |
| Catalyst Productivity (g/g) | 6497 | 7090 | 8043 | 8193 |
| Solids (wt %) | 30.0 | 29.8 | 32.5 | 24.2 |
| Ethylene (vol %) | 10.4 | 13.2 | 14.6 | 13.5 |
| Hydrogen (vol %) | 0.34 | 0.26 | 0.33 | 0.26 |
| Ethylene feed kg/h | 7.6 | 7.6 | 7.3 | 6.8 |
| Residence time (hours) | 1.96 | 1.89 | 2.0 | 1.75 |
| Product: | | | | |
| HLMI (21.6 kg: g/10 mins) | 1.27 | 13.1 | 1.19 | 9.4 |

Example 2a

Preparation of 2,6-diacetylpyridinebis(2,4,6 trimethyl anil) FeCl$_2$ Supported on Silica (Catalyst 3)

Catalyst 1 was made as described in detail in WO 99/46304, incorporated herein by reference. The silica support was preimpregnated with MAO (methylaluminoxane).

Example 2b

Preparation of Chromium Catalyst (Catalyst 4)

Into a fluidized bed reactor heated at 30° C. and supplied with a fluidisation gas composed of nitrogen containing less than 2 vpm of water vapour and with a flow rate of 4.7 ml/s, were charged 15 kg of a granular chromium catalyst sold under the trade name EP30XA by Ineos Silicas (Warrington, England). The characteristics of this catalyst are: surface area=320 m$^2$/g, pore volume=1.7 ml/g and chromium content=0.25% by weight. Next the reactor was heated from 60° C. to 150° C. at a rate of 100° C./h. The catalyst was then maintained at 150° C. for 30 minutes in the fluidised state. Next 12.5 moles of a mixture of isopropyl titanate and n-butyl titanate sold under the trade name "Tilcom BIP" by Titanium Intermediates Limited (Billingham, England) were introduced into the reactor. The reactor was then maintained at 150° C. for 2 hours. The reactor was then heated from 150° C. to 300° C. at a rate of 100° C./h.

Next the fluidisation by dry nitrogen was changed to fluidisation by dry air. The catalyst was heated to 815° C. at 100° C./h and then maintained at 815° C. for 5 hr in the fluidised state. Next the catalyst was cooled to 300° C. at 100° C./h. The fluidisation by dry air was then changed to fluidisation by dry nitrogen, and the catalyst cooled to room temperature and stored under dry nitrogen.

Example 2c

Pilot Scale Process Operation

Transitioning Between pyridinecarboxaldehydebis(imine) Type Catalyst and Phillips Catalyst A fluidised bed reactor 74 cm in diameter was used for the polymerisations. This contained a fluidized bed and was operated at 90° C. using Catalyst 3. The gas phase was composed of hydrogen, nitrogen, ethylene and hexane fluidised at 42 cm/sec. The partial pressures of the components of the gas mixture are given in Condition 1 of Table 2 below.

At the start of the transition the injections of Catalyst 3 were stopped, the gas phase maintained in Condition 1 and the reaction deactivated until the ethylene feed to the reactor had fallen to less than 15 kg/hr. At this point feeds to the reactor were stopped. No reactor kill agents were added.

The gas phase was purged with nitrogen and the fluidized bed lowered to a height of 3 m. A new gas phase of hydrogen, nitrogen, ethylene and pentane was then established with the values given in Condition 2 of Table 2.

Chromium catalyst injections using Catalyst 4 manufactured as described above were started at 15 injections per hour and an antistatic agent feed started. Ethylene was fed to the reactor to maintain the ethylene partial pressure in the range 5–7 bar, with the hydrogen to ethylene partial pressure ratio maintained at 0.36.

Once reaction was established the catalyst injection ratio was increased by +1 injection/hr whilst adjusting the ethylene feed to maintain an ethylene partial pressure in the reactor of 5–7 bar. When the reactor bed height reached 5 m, product withdrawal was started and fluidisation gas velocity in the reactor increased to 42 cm/s. After three bed renewals the reaction temperature was increased to 105° C. at 1° C./hr and the hydrogen partial pressure increased to 3 bar. The reaction was stabilized at 100 kg/hr at the operating conditions given in Condition 3 of Table 2.

TABLE 2

| Parameter | Units | Condition 1 | Condition 2 | Condition 3 |
|---|---|---|---|---|
| Temperature | ° C. | 90 | 90 | 105 |
| Reactor pressure | barg | 20 | 20 | 20 |
| Ethylene partial pressure | bar | 10 | 6 | 6 |
| Fluidising velocity | cm/s | 42 | 37 | 40 |
| Fluidised bed height | m | 5 | 3 | 5 |
| $H_2/C_2$ partial pressure ratio | | 0.2 | 0.3666 | 0.5 |
| Hydrogen partial pressure | b | 2 | 2 | 3 |
| Hexane partial pressure | bar | 0.8 | 0 | 0 |
| Pentane partial pressure | bar | 0 | 2 | 2 |
| Antistatic agent flow rate with respect to ethylene feed | ppm | 0 | 2 | 2 |
| Product: | | | | |
| Non-annealed density | | | 961 | 958 |
| MI | HLMI | | 12.2 | |
| | MI (2.16 kg) | | | 0.9 |

The above results show how a smooth transition between catalysts was possible without the need for the addition of catalyst killers.

What is claimed is:

1. Process for the polymerisation or copolymerisation of 1-olefins in which a transition is made from polymerisation using a first catalyst to polymerisation using a second catalyst, said process comprising the steps of a) feeding a first catalyst into a polymerisation reactor to effect polymerisation or copolymerisation of 1-olefins in the reactor, b) discontinuing the feed of the first catalyst into the polymerisation reactor in which polymerisation or copolymerisation with said first catalyst has been occurring, and then c) introducing a second catalyst into the reactor,
      wherein one of the catalysts comprises a late transition metal catalyst and the other is a catalyst which is incompatible therewith.

2. Process according to claim 1, including removing between zero and half of the contents of the polymerisation reactor by volume before introduction of the second catalyst.

3. Process according to claim 2, wherein none of the contents of the polymerisation reactor by volume are removed before introduction of the second catalyst.

4. Process according to any one of claims 1 to 3, wherein the second catalyst is introduced without first eliminating all activity of the first catalyst and/or without first removing all traces of the first catalyst.

5. Process according to any one of claims 1 to 3, including subsequent to step b), introducing into the polymerisation reactor before the second catalyst is introduced into the reactor a deactivating agent to at least partially reduce the activity of the first catalyst.

6. Process according to claim 5, wherein the activity of the first catalyst is reduced by up to 30% from its maximum activity prior to the introduction of the second catalyst.

7. Process according to claim 5, wherein the activity of the first catalyst is reduced by at least 95% from its maximum activity prior to the introduction of the second catalyst.

8. Process according to claim 1, wherein the late transition metal catalyst is a complex of the formula

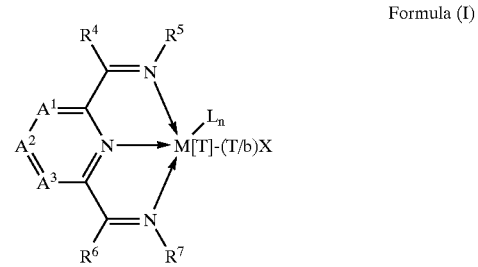

Formula (I)

wherein M is Fe[II], Fe[III], Co[II], Co[III], Ni[II], Rh[II], Rh[III], Ru[II], Ru[III], Ru[IV] or Pd[II]; X represents an atom or group covalently or ionically bonded to the transition metal M; T is the oxidation state of the transition metal M and b is the valency of the atom or group X; L is a group datively bound to M, and n is from 0 to 5; $A^1$ to $A^3$ are each independently N or P or CR, with the proviso that at least one is CR; and R and $R^4$ to $R^7$ are each independently selected from hydrogen, halogen, hydrocarbyl, substituted hydrocarbyl, heterohydrocarbyl, substituted heterohydrocarbyl or $SiR'_3$ where each R' is independently selected from hydrogen, halogen, hydrocarbyl, substituted hydrocarbyl, heterohydrocarbyl or substituted heterohydrocarbyl.

9. Process according to claim 8, wherein the complex of Formula (I) has the formula

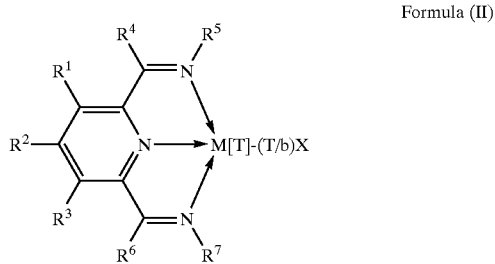

Formula (II)

wherein $R^1$ to $R^7$ are each independently selected from hydrogen, halogen, hydrocarbyl, substituted hydrocarbyl, heterohydrocarbyl, substituted heterohydrocarbyl or $SiR'_3$ where each R' is independently selected from hydrogen, halogen, hydrocarbyl, substituted hydrocarbyl, heterohydrocarbyl or substituted heterohydrocarbyl.

10. Process according to claim 9, wherein $R^5$ is represented by the group "P" and $R^7$ is represented by the group "Q" as follows:

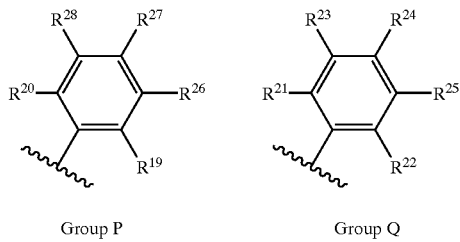

Group P         Group Q wherein $R^{19}$ to $R^{28}$ are independently selected from hydrogen, halogen, hydrocarbyl, substituted hydrocarbyl, heterohydrocarbyl or substituted heterohydrocarbyl; when any two or more of $R^1$ to $R^4$, $R^6$ and $R^{19}$ to $R^{28}$ are hydrocarbyl, substituted hydrocarbyl, heterohydrocarbyl or substituted heterohydrocarbyl, said two or more can be linked to form one or more cyclic substituents.

11. Process according to claim 8, wherein the late transition metal complex is:
2,6-diacetylpyridinebis(2,6-diisopropylanil)$FeCl_2$;
2,6-diacetylpyridinebis(2,6-diisopropylanil)$CoCl_2$;
2,6-diacetylpyridinebis(2-tert.-butylanil)$FeCl_2$;
2,6-diacetylpyridinebis(2,3-dimethylanil)$FeCl_2$;
2,6-diacetylpyridinebis(2-methylanil)$FeCl_2$;
2,6-diacetylpyridinebis(2,4-dimethylanil)$FeCl_2$;
2,6-diacetylpyridinebis(2,6-dimethylanil)$FeCl_2$;
2,6-diacetylpyridinebis(2,4,6-trimethylanil)$FeCl_2$;
2,6-dialdiminepyridinebis(2,6-dimethylanil)$FeCl_2$;
2,6-dialdiminepyridinebis(2,6-diethylanil)$FeCl_2$;
2,6-dialdiminepyridinebis(2,6-diisopropylanil)$FeCl_2$;
2,6-dialdiminepyridinebis(1-naphthil)$FeCl_2$; or
2,6-bis(1,1-diphenylhydrazone)pyridine$FeCl_2$.

12. Process according to claim 1 wherein the incompatible catalyst is a Phillips type (chromium) catalyst.

13. Process according to claim 1, wherein the polymerisation is slurry phase polymerisation or gas phase polymerisation.

14. Process according to claim 5, wherein the deactivating agent is oxygen, water, ammonia, carbon monoxide, carbon dioxide, an alcohol or a ketone.

15. Process according to claim 5, wherein the activity of the first catalyst is reduced by up to 50% or more from its maximum activity prior to the introduction of the second catalyst.

16. Process according to claim 5, wherein the activity of the first catalyst is reduced by up to 70% or more from its maximum activity prior to the introduction of the second catalyst.

17. Process according to claim 5, wherein the activity of the first catalyst is reduced by up to 95% or more from its maximum activity prior to the introduction of the second catalyst.

18. Process according to claim 5, wherein the activity of the first catalyst is killed completely prior to the introduction of the second catalyst.

* * * * *

UNITED STATES PATENT AND TRADEMARK OFFICE
CERTIFICATE OF CORRECTION

PATENT NO.   : 6,825,292 B2
DATED        : November 30, 2004
INVENTOR(S)  : John Norman Reid Samson It is certified that error appears in the above-identified patent and that said Letters Patent is hereby corrected as shown below:

Title page,
Item [75], Inventor, "John Norman Reid," should read -- John Norman Reid Samson, --.

Signed and Sealed this

Thirtieth Day of August, 2005

JON W. DUDAS
*Director of the United States Patent and Trademark Office*